United States Patent
Fuchtner et al.

(10) Patent No.: US 10,040,441 B2
(45) Date of Patent: Aug. 7, 2018

(54) HYBRID VEHICLE

(75) Inventors: Martin Fuchtner, Stuttgart (DE); Dieter Kraxner, Vaihingen an der Enz (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 59 days.

(21) Appl. No.: 12/667,874

(22) PCT Filed: May 23, 2008

(86) PCT No.: PCT/EP2008/004104
§ 371 (c)(1),
(2), (4) Date: Jan. 21, 2010

(87) PCT Pub. No.: WO2009/006967
PCT Pub. Date: Jan. 15, 2009

(65) Prior Publication Data
US 2010/0193269 A1  Aug. 5, 2010

(30) Foreign Application Priority Data
Jul. 6, 2007  (DE) .................. 10 2007 031 605

(51) Int. Cl.
*B60K 6/42* (2007.10)
*B60W 20/10* (2016.01)
(Continued)

(52) U.S. Cl.
CPC .............. *B60W 20/10* (2013.01); *B60K 6/38* (2013.01); *B60K 6/40* (2013.01); *B60K 6/44* (2013.01); *B60K 6/442* (2013.01); *B60K 6/48* (2013.01); *B60K 6/52* (2013.01); *B60K 17/356* (2013.01); *B60W 10/06* (2013.01); *B60W 10/08* (2013.01); *B60W 10/24* (2013.01); *B60W 20/00* (2013.01);
(Continued)

(58) Field of Classification Search
CPC ... B60K 6/40; B60K 6/52; B60K 6/48; B60K 6/387; B60K 1/02; B60K 2006/262
USPC ...... 180/65.22, 65.225, 65.23, 65.235, 65.24, 180/65.245, 65.25, 65.26
See application file for complete search history.

(56) References Cited

U.S. PATENT DOCUMENTS 827,766 A * 8/1906 Weiss .............................. 290/15
4,267,895 A * 5/1981 Eggert, Jr. ................... 180/68.1
(Continued)

FOREIGN PATENT DOCUMENTS

AT  006 377  9/2003
EP  0 224 144  6/1987
(Continued)

*Primary Examiner* — Emma K Frick
(74) *Attorney, Agent, or Firm* — Gerald E. Hespos; Michael J. Porco; Matthew T. Hespos

(57) ABSTRACT

A hybrid vehicle having a rear-mounted internal combustion engine, an electric energy accumulator, and at least one electric machine which is provided as a generator for charging the electric energy accumulator during an energy recovery phase and respectively as at least an additional drive to the internal combustion engine during a drive phase, wherein the internal combustion engine drives the rear axle of the hybrid vehicle, and wherein the electric machine, or each electric machine is provided at a distance from the rear axle, in particular in the region of the front axle.

7 Claims, 2 Drawing Sheets

(51) Int. Cl.

| | |
|---|---|
| *B60W 10/24* | (2006.01) |
| *B60K 6/38* | (2007.10) |
| *B60K 6/40* | (2007.10) |
| *B60K 6/44* | (2007.10) |
| *B60K 6/442* | (2007.10) |
| *B60K 6/48* | (2007.10) |
| *B60K 6/52* | (2007.10) |
| *B60K 17/356* | (2006.01) |
| *B60W 10/06* | (2006.01) |
| *B60W 10/08* | (2006.01) |
| *B60W 20/00* | (2016.01) |
| *B60K 1/02* | (2006.01) |
| *B60K 5/02* | (2006.01) |
| *B60K 7/00* | (2006.01) |

(52) U.S. Cl.
CPC ............... *B60K 1/02* (2013.01); *B60K 5/02* (2013.01); *B60K 7/0007* (2013.01); *B60W 2510/24* (2013.01); *Y02T 10/623* (2013.01); *Y02T 10/6221* (2013.01); *Y02T 10/6234* (2013.01); *Y02T 10/6265* (2013.01); *Y02T 10/6286* (2013.01); *Y02T 10/92* (2013.01)

(56) References Cited

U.S. PATENT DOCUMENTS

| | | | |
|---|---|---|---|
| 5,419,406 A | | 5/1995 | Kawamoto et al. |
| 5,562,566 A | * | 10/1996 | Yang ................................ 477/3 |
| 6,041,877 A | * | 3/2000 | Yamada et al. ............ 180/65.25 |
| 6,048,289 A | * | 4/2000 | Hattori et al. .................. 477/15 |
| 6,484,832 B1 | * | 11/2002 | Morisawa et al. ........ 180/65.225 |
| 6,540,636 B2 | * | 4/2003 | Amanuma et al. ............ 475/149 |
| 6,557,656 B2 | * | 5/2003 | Haniu et al. ................ 180/65.6 |
| 7,497,285 B1 | * | 3/2009 | Radev ...................... 180/65.225 |
| 7,533,754 B2 | * | 5/2009 | Burrows et al. ............... 180/248 |
| 7,572,201 B2 | * | 8/2009 | Supina et al. ..................... 475/5 |
| 7,583,036 B2 | * | 9/2009 | Kikuchi et al. .................... 318/5 |
| 7,661,495 B2 | * | 2/2010 | Zohrer et al. .............. 180/65.22 |
| 7,694,773 B2 | * | 4/2010 | Janson et al. ................. 180/243 |
| 7,722,499 B2 | * | 5/2010 | Soliman ................. B60K 6/445 |
| | | | 477/181 |
| 7,950,480 B2 | | 5/2011 | Raoul |
| 2003/0234124 A1 | | 12/2003 | Pecnik et al. |
| 2004/0011576 A1 | * | 1/2004 | Taniguchi et al. ............ 180/65.2 |
| 2005/0060076 A1 | * | 3/2005 | Phillips et al. ................... 701/51 |
| 2005/0124451 A1 | * | 6/2005 | Morikawa ........................ 475/6 |
| 2006/0048982 A1 | * | 3/2006 | Yamamoto et al. .......... 180/65.2 |
| 2006/0186738 A1 | * | 8/2006 | Noguchi et al. ................ 307/10.1 |
| 2006/0237250 A1 | * | 10/2006 | Kowatari et al. ............... 180/242 |
| 2006/0266569 A1 | * | 11/2006 | Fujiwara et al. ............. 180/65.2 |
| 2007/0034428 A1 | * | 2/2007 | Janson ......................... 180/65.3 |
| 2007/0068712 A1 | * | 3/2007 | Carnahan ..................... 180/65.2 |
| 2007/0137908 A1 | * | 6/2007 | Fujiwara et al. ............. 180/65.2 |
| 2007/0144797 A1 | * | 6/2007 | Tarasinski et al. ........... 180/6.28 |
| 2009/0288901 A1 | * | 11/2009 | Iwaki et al. .................. 180/242 |
| 2013/0306394 A1 | * | 11/2013 | Theodore ..................... 180/291 |

FOREIGN PATENT DOCUMENTS

| | | |
|---|---|---|
| EP | 1 296 440 | 3/2003 |
| GB | 232772 | 4/1925 |
| GB | 2324772 | * 11/1998 |
| JP | 09-079348 | * 3/1997 |
| WO | 02/072375 | 9/2002 |

\* cited by examiner

HYBRID VEHICLE

BACKGROUND OF THE INVENTION

1. Field of the Invention

The present invention relates to a hybrid vehicle having at least one electric machine, wherein the electric machine is provided as at least an additional drive to an internal combustion engine during a drive phase.

2. Description of the Related Art

Hybrid vehicles are usually equipped with an internal combustion engine and an electric machine, wherein the internal combustion engine can usually only either charge an electric energy accumulator, for example a vehicle battery, (serial hybrid) or be mechanically connected to a drive shaft (parallel hybrid) or both. In order to be able to lower the fuel consumption or the energy consumption of the hybrid vehicle here, the electric machine is used as a generator when the vehicle is being braked and the electric energy accumulator is therefore charged. The electric machine therefore acts as an electromotive brake and recovers energy. Furthermore, this reduces the wear on the brake linings of the hybrid vehicle, which allows replacement which is due to wear, and therefore maintenance costs, to be decreased. Additionally or alternatively to this it is possible to provide an at least additional operating mode of the electric machine as a motor. As a result, in addition to the driving of the hybrid vehicle by the internal combustion engine, an additional electric drive (boosting) is possible. Furthermore an exclusively electric travel can be provided with the electric machine, for example over short distances when there are restrictions on emission.

In particular, not only purely electric travel but also recovery of a corresponding quantity of electrical energy and sufficient boosting require an adequately dimensioned electric machine. However, this electric machine requires corresponding installation space, increases the vehicle's weight and consequently also influences its movement dynamics.

The object of the invention is to remedy this.

SUMMARY OF THE INVENTION

Providing the usually voluminous and heavy electric machine at a distance from the rear axle, in particular in the region of the front axle, in a hybrid vehicle having a rear-mounted internal combustion engine, an electric energy accumulator and at least one electric machine in which the internal combustion engine drives the rear axle, provides a number of advantages. This results in a more balanced weight distribution of the hybrid vehicle by virtue of the fact that the heavy electric machine does not additionally increase the weight of the internal combustion engine and transmission, which causes loading on the rear axle. Furthermore, additional installation space is obtained and the installation space, of which much is already taken up by the internal combustion engine and the transmission, in the region of the rear axle does not have to additionally accommodate the voluminous electric machine. The respective arrangement of an electric machine can therefore be selected individually in order to optimize the movement dynamics and utilize the installation space of the hybrid vehicle. In addition, the invention provides the basis for a modular four-wheel drive of the hybrid vehicle by virtue of the fact that an at least electric drive of the front axle can be implemented more simply, and by virtue of the fact that it is made possible for the mechanical components, such as for example shafts, which are used to place the electric machine at a distance, to be used for a corresponding four-wheel drive by means of the internal combustion engine. Finally, the invention provides, in hybrid vehicles with a rear-mounted internal combustion engine, the option of energy recovery at the front axle, which due to the relatively large wheel load is more favorable than at the rear axle.

The same advantages are obtained if in a hybrid vehicle having a front-mounted internal combustion engine, an electric energy accumulator, and at least one electric machine which is provided as a generator for charging the electric energy accumulator during an energy recovery phase and respectively as at least an additional drive to the internal combustion engine during a drive phase, wherein the internal combustion engine drives the front axle of the hybrid vehicle, if the electric machine, or each electric machine, is provided at a distance from the front axle, in particular in the region of the rear axle.

In a first preferred embodiment of the invention, the at least one electric machine is provided on the transmission input shaft at a distance from the transmission. Here, the distribution of weight of the hybrid vehicle is optimized by virtue of the fact that the heavy electric machine is displaced in the direction of the non-driven axle. The internal combustion engine can be advantageously started by the electric machine either in the stationary state or during travel. Furthermore, a corresponding configuration, in particular of the length of the transmission input shaft, permits the electric machine to be placed in a particularly simple way in a desired and available installation space of the hybrid vehicle. Energy recovery is possible via the rear axle, and boosting and electric travel are possible via the transmission input shaft onto the rear axle. In addition, load point shifting of the internal combustion engine is possible by means of the electric machine and the transmission input shaft.

In this context, an at least optional, conventional all-wheel drive (i.e. by means of the internal combustion engine) is then advantageously possible. For this purpose, the transmission input shaft is extended beyond the electric machine as far as the region of the front axle and is coupled mechanically thereto via a clutch and axle gearing. As a result, when the transmission is connected through ("direct", i.e. neither stepping up nor stepping down and therefore elimination of gearing losses) driving of the front axle by the internal combustion engine can be brought about. By taking into account the axle gearing efficiency level, it is then possible to use either the rear axle or both the rear axle and the front axle for the purpose of recovery, for boosting and for electric travel.

Further advantages will then be obtained if a separate electric machine is assigned to each wheel of the front axle via a respective clutch. In turn, the coupling to the transmission input shaft is produced via the front axle gearing (differential). As a result, electric "torque vectoring" (possibility of vehicle movement dynamics control by means of wheel-specific distribution of torque) at the front axle becomes possible, in which case the basic locking torque at the differential can be adjusted.

In a second advantageous embodiment of the invention, the at least one electric machine is connected to the front axle of the hybrid vehicle. The operative connection between the front axle and the electric machine provides, in particular, the advantage that recovery is made possible via the front axle where the wheel load and therefore also the recoverable energy is greater than at the rear axle. This also entails corresponding relieving of loading on the front axle brakes. In addition, excellent vehicle movement dynamics are obtained since distribution of drive torque at relatively high acceleration values is dominated by the internal combustion engine on the rear axle, which is usually given larger dimensions than the electric machine on the front axle. Accordingly, in the case of electric travel i.e. at rather small values of acceleration and/or of drive torques, a front axle drive is also possible in terms of vehicle movement dynamics considerations.

In this embodiment, the internal combustion engine of the hybrid vehicle additionally has a pinion, crankshaft or belt-driven starter/generator as a second electric machine, for the state of the motor in the stationary state and during travel. This embodiment already permits full hybrid functionality via the front axle, in particular energy recovery, boosting and electric travel. The use of a pinion, crankshaft or belt-driven starter/generator as a second electric machine also permits a serial hybrid operating mode as an additional advantage.

A particular space-saving embodiment is obtained if no mechanical connection is provided between the front axle and the internal combustion engine, i.e. to the rear axle. This can be implemented by means of a single electric machine which is coupled to the front axle via an axle gearing. It is therefore possible for a separate electric machine to be provided for each wheel of the front axle. Since these two electric machines do not have to have a connection to one another, a saving in weight is obtained through the possible elimination of the axle gearing. In addition, the use of two electric machines permits electric "torque vectoring" at the front axle.

A conventional all-wheel drive i.e. by means of the internal combustion engine, becomes possible if the internal combustion engine is connected mechanically, i.e. by means of a shaft, to the front axle of the hybrid vehicle. In such a case, the conventional all-wheel drive can also be shifted optionally by providing a clutch. The conventional all-wheel drive supplies a better efficiency level here in certain operating ranges, such as for example constant travel, than the purely electric drive of the front axle in addition to the driving of the rear axle by the internal combustion engine. By taking into account the axle gearing efficiency level, it is now possible to use either the front axle or else both the rear axle and the front axle for energy recovery, for boosting and for electric travel. An individual electric machine can also be provided here either parallel to the front axle or parallel to the shaft between the internal combustion engine and the front axle, or a separate electric machine can be provided for each wheel of the front axle. For all the described variants, it is advantageously proposed to provide an additional clutch between a respective electric machine and a connected, rotating mass such as, for example, a transmission shaft. This makes it possible, on the one hand to obtain a saving by eliminating the idling energization of the electric machine, which would otherwise be necessary in order to overcome the mechanical resistance when the electric machine is unloaded. The decoupling of the unloaded electric machine, when the hybrid vehicle is rolling freely ("coasting") is provided for this purpose. On the other hand, specific adjustment of the electric machine for a particular operating range is possible, for example the range of relatively low rotational speeds. Outside this range, for example in the range of relatively high rotational speeds, decoupling of the electric machine would be provided in order, for example, to avoid bursting of the electric machine or in order to obtain a saving by eliminating the moment of inertia in the drive train. Accordingly, such an additional clutch is then provided between the electric machine and the transmission when an individual electric machine is arranged on the transmission input shaft or a shaft which is connected to the transmission. When there is separate electric machine for each wheel of the front axle, such an additional clutch would be respectively provided between the electric machine and the wheel. A corresponding method would provide for the additional clutch to be opened when the electric machine was no longer loaded or if a specific operating parameter moved out of a predefineable operating range. Accordingly, the additional clutch would then be closed when the electric machine was loaded again or if a specific operating parameter entered a predefineable operating range.

The invention will now be described in more detail with reference to a drawing.

DETAILED DESCRIPTION OF THE PREFERRED EMBODIMENTS

Figure 1:
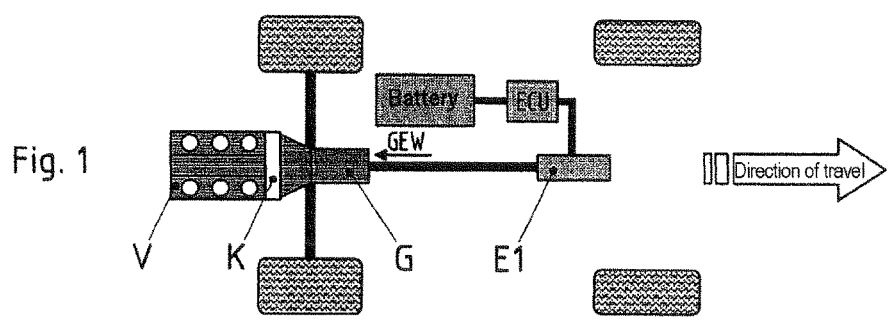
FIGS. 1-7 are schematic illustrations of hybrid vehicles in accordance with the invention.
Figure 2:
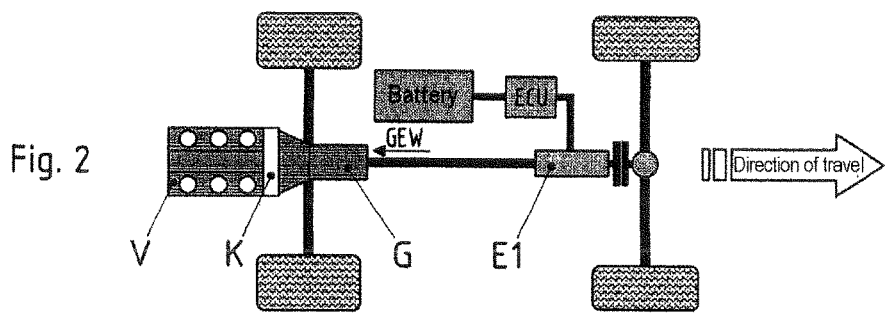
Figure 3:
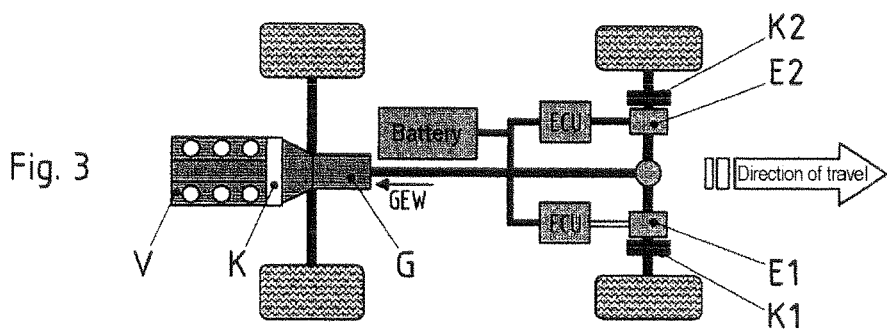

FIGS. 1 to 3 show three different versions of the first embodiment of the invention. In this embodiment, the at least one electric machine, E1, E2 is always provided on the transmission input shaft GEW of the internal combustion engine V. The internal combustion engine V is started by the electric machine E1, E2 both from the stationary state of the vehicle and during travel (for example after a phase of free rolling or electric travel). When the internal combustion engine V starts there is therefore no need for a separate electric machine on the internal combustion engine V itself, which produces advantages in terms of installation space and an improved distribution of weight in the hybrid vehicle.

FIG. 1 shows a solution which is particularly simple in structural terms in which only mechanical connection of the electric machine E1 to the rear axle driven by the internal combustion engine V is provided. This already results in a complete hybrid functionality. Load point shifting of the internal combustion engine V is therefore possible by means of the transmission input shaft GEW and the electric machine E1. Boosting is possible via the electric machine E1, driven as an electric motor, onto the transmission input shaft GEW, and energy recovery is possible by means of the rear axle via the electric machine E1 operating as a generator. Electric travel by means of the electric machine E1 using the transmission G onto the rear axle is also possible. In this context, it is additionally possible to provide a clutch on the transmission input shaft GEW between the electric machine E1 and the transmission G. Said clutch permits decoupling of the electric machine E1, in order to obtain a saving by eliminating the idling energization and to carry out better adjustment for a specific operating range, such as, for example low speeds.

FIG. 2 shows a development of the first embodiment of the invention in which a conventional all-wheel drive, that is to say one powered by an internal combustion engine, is additionally provided. However, in this configuration this is possible only if the transmission G is shifted into the direct gear speed, i.e. if there is neither stepping up nor stepping down. Compared to the configuration illustrated in FIG. 1, further differences which arise are that boosting or energy recovery and electric travel are then also possible via both axles in the direct gear speed. In turn, it is also possible to provide a clutch between the electric machine E1 and the transmission G on the transmission input shaft GEW here in order to obtain a saving by eliminating the idling energization and in order to carry out better adjustment of the electric machine for a specific operating range.

A different version of the first embodiment of the invention is shown by FIG. 3. Here, two electric machines E1, E2 are provided and are assigned to the respective wheels of the front axle. Boosting, energy recovery and electric travel are possible either via the rear axle or via both axles taking into account the axle gearing efficiency level. In addition, there is the possibility of providing electric "torque vectoring" at the front axle, in which case the basic locking torque at the axle gearing (differential) can be set. In order to start the internal combustion engine V in the stationary state of the vehicle, the clutches K1 and K2 are opened, the clutch K0 is closed and the internal combustion engine V tow-started with the two electric machines E1 and E2. In the case of electric travel, the clutches K1 and K2 are closed and the clutch K0 is open. In order then to start the internal combustion engine V, the clutch K0 is closed and at the same time the electric machines E1 and E2 are started, producing the driving torque/starting torque for the internal combustion engine V.

FIG. 4 to FIG. 7 each show specific configurations of the second embodiment of the invention, in which the at least one electric machine E1, E2 is connected to the front axle. In order to start the internal combustion engine V, a starter/generator SG is respectively provided as a further electric machine for the stationary state of the vehicle and during travel. As a result, at least two electric machines E1, E2 SG are present, as a result of which a serial hybrid drive can be formed.

Figure 4:
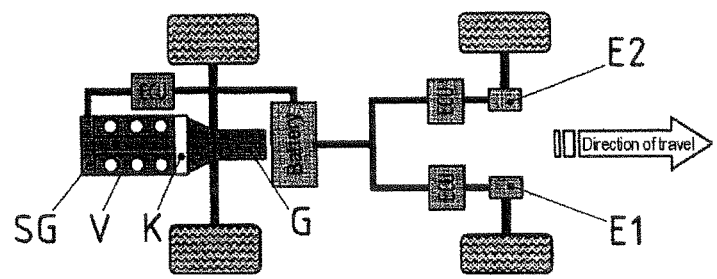

FIG. 4 shows a configuration of the second embodiment of the invention in which there is no mechanical connection between the front axle and rear axle. A separate electric machine E1, E2 is assigned to each wheel of the front axle, making electric "torque vectoring" possible. Boosting, energy recovery and electric travel are each possible via the front axles. Load point shifting of the internal combustion engine V can be carried out by means of the wheels, that is to say by "braking" at the front axle or by means of the starter/generator SG of the internal combustion engine V. A saving can be obtained by eliminating the idling energization of a respective electric machine E1, E2 by means of, in each case, one clutch between the electric machines E1 and E2 and the assigned wheels.

Figure 5:
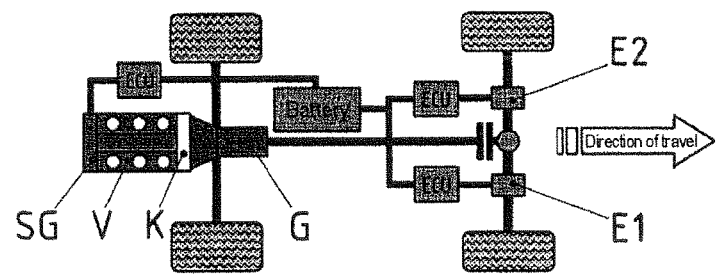

FIG. 5 shows a configuration of the second embodiment of the invention in which, in addition to the configuration shown in fixture 4, a mechanical connection is provided between the rear axle and front axle of the hybrid vehicle. This makes it possible to form a conventional all-wheel drive, that is to say one powered by an internal combustion engine. For an optional, that is to say shiftable, all-wheel drive, it is possible in this context to provide a clutch in the shaft between the front axle and rear axle. Load point shifting of the internal combustion engine V via the cardan shaft, clutch and axle gearing is possible and is subject to the gearing/axle gearing efficiency level. Boosting, energy recovery and electric travel is possible either via the front axle or via the front and rear axles, in which case this is subject to the axle gearing efficiency level.

Figure 6:
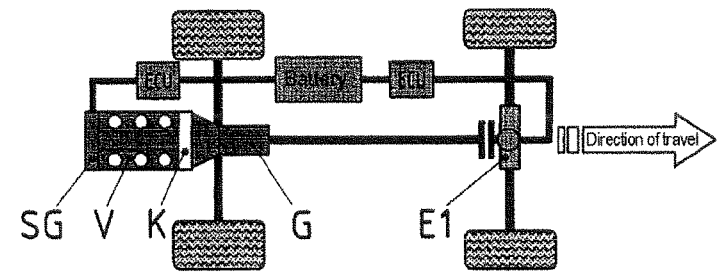
Figure 7:
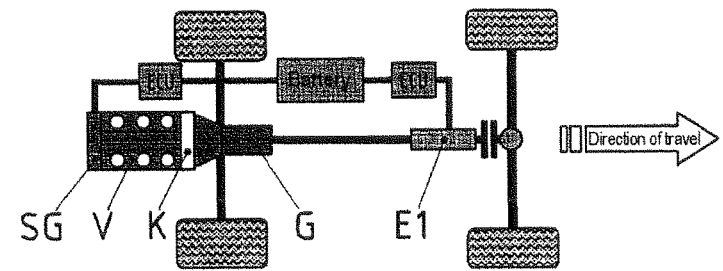

FIG. 6 and FIG. 7 show two configurations which are alternatives to FIG. 5 and which each provides just one electric machine E1 instead of two. This permits a simpler mechanical structure, but there is no longer the possibility of electric "toque vectoring" at the front axle. While an arrangement of the electric machine E1 on the front axle and parallel thereto provides according to FIG. 6, in FIG. 7 there is a possibility of arranging the electric machine E1 on the shaft between the transmission G and the axle gearing of the front axle. In this context it is in turn possible to provide a clutch between the electric machine E1 and the transmission G, for the purpose of decoupling the electric machine E1 in order to obtain a saving by eliminating the idling energization and in order to carry out better adjustment for a specific operating range.

The invention claimed is:

1. A hybrid vehicle having a rear end and a front end spaced from the rear end in a forward direction of travel of the vehicle, the rear end having a rear axle with rear wheels and the front end having a front axle with front wheels, the hybrid vehicle, comprising:
   an internal combustion engine mounted rearward of the rear axle and aligned transverse to the rear axle,
   an electric energy accumulator,
   at least one primary electric machine connected electrically to the electric energy accumulator and operable as a generator for charging the electric energy accumulator during an energy recovery phase and connectable to at least the front axle to provide an additional drive to the internal combustion engine during a drive phase, the at least one primary electric machine being disposed at least partly between the front wheels to facilitate a substantially balanced weight distribution of the hybrid vehicle, and
   a starter generator as a further electric machine for starting the internal combustion engine during a stationary state of the vehicle or during travel, the starter generator being rearward of and aligned with the internal combustion engine, wherein
   the internal combustion engine and the at least one primary electric machine are selectively connectable to one another by a shaft and are selectively connectable to at least one of the front axle and the rear axle of the hybrid vehicle for driving at least one of the front and rear axles of the hybrid vehicle,
   the at least one primary electric machine and the further electric machine are aligned with one another and with the shaft,
   the at least one primary electric machine is selectively coupled to or decoupled from the front axle of the hybrid vehicle via an axle gearing provided at least partly in a region between the front wheels of the front axle and a clutch between the axle gearing and the at least one primary electric machine, and
   the internal combustion engine is connected selectively to the at least one primary electric machine so that the internal combustion engine selectively drives the at least one primary electric machine, and the internal combustion engine also is connected to the further electric machine so that, during a serial hybrid operation mode, the internal combustion engine causes the further electric machine to function as a generator and so that the electric energy accumulator operates the at least one primary electric machine for driving at least one of the front and rear axles, and so that both the front and rear axles are used for energy recovery, for boosting and for electric travel, thereby enabling recovery of a higher recoverable energy that exists at the front axle as compared to the rear axle.

2. The hybrid vehicle of claim 1, wherein the shaft is a transmission input shaft and the at least one primary electric machine is provided on the transmission input shaft at a distance from a transmission of the vehicle.

3. The hybrid vehicle of claim 2, wherein the transmission input shaft is extended as far as the region of the front axle and is coupled mechanically thereto via the clutch and the axle gearing.

4. The hybrid vehicle of claim 1, wherein the further electric machine is connected electrically to the electric energy accumulator.

5. A hybrid vehicle having rear and front axles spaced apart along a forward-rearward direction of the vehicle, comprising:
   an internal combustion engine mounted rearward of the rear axle and aligned transverse to the rear axle,
   a transmission connected to the internal combustion engine, the transmission being disposed forward of the internal combustion engine and in proximity to the rear axle,
   a shaft extending forward from the transmission
   an electric energy accumulator,
   at least one primary electric machine connected electrically to the electric energy accumulator and being connected mechanically to a front end of the shaft, the at least one primary electric machine being operable as a generator for charging the electric energy accumulator during an energy recovery phase and being connectable to at least the front axle to provide an additional drive to the internal combustion engine during a drive phase,
   wherein
   the internal combustion engine is selectively connectable mechanically to at least one of the rear axle and the front axle of the hybrid vehicle for driving at least one of the rear and front axles of the hybrid vehicle,
   the at least one primary electric machine is coupled to or decoupled from the front axle of the hybrid vehicle via an axle gearing and a selectively openable clutch between the axle gearing and the at least one primary electric machine, the at least one primary electric machine being provided at least partly in a region between wheels of the front axle to facilitate a substantially balanced weight distribution of the hybrid vehicle, and
   a starter generator as a further electric machine that is mounted to a rear end of the internal combustion engine and connected to the internal combustion engine for starting the internal combustion engine during a stationary state of the vehicle or during travel, and so that the internal combustion engine selectively operates the further electric machine as a generator for charging the electric energy accumulator during the energy recovery phase, whereby both the front and rear axles are used for energy recovery, for boosting and for electric travel, thereby enabling recovery of a higher recoverable energy that exists at the front axle as compared to the rear axle.

6. The hybrid vehicle of claim 5, wherein the transmission input shaft is extended as far as the region of the front axle and is coupled mechanically thereto via the clutch and axle gearing.

7. The hybrid vehicle of claim 5, wherein the further electric machine is connected electrically to the electric energy accumulator.

* * * * *